Sept. 24, 1963  J. F. BERRY  3,104,417
HUMANE ELECTRICAL STUNNERS
Filed Dec. 22, 1960
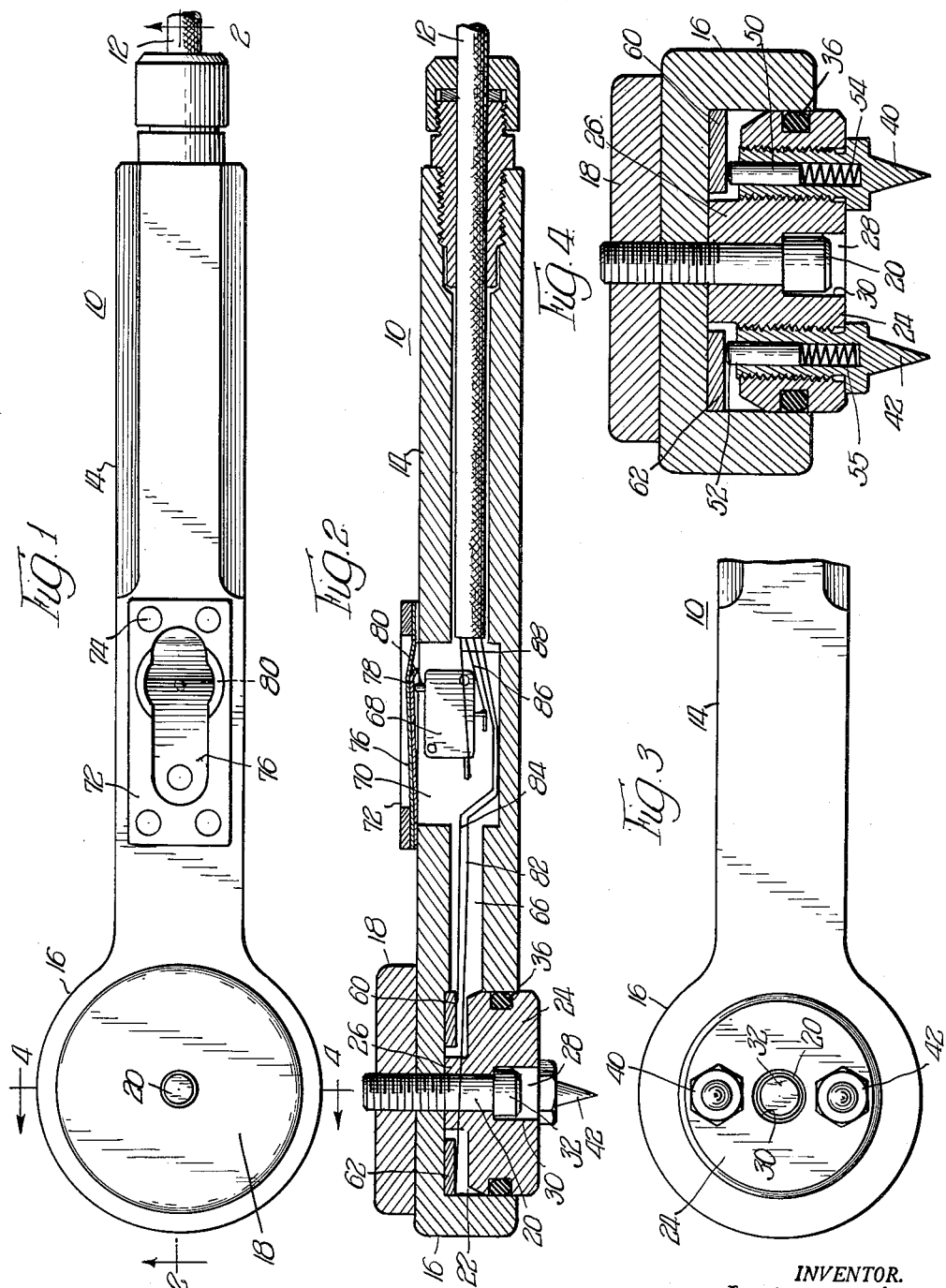
INVENTOR.
J. F. Berry,
BY
Byron, Hume, Groen & Clement
ATTYS.

3,104,417
HUMANE ELECTRICAL STUNNERS
John Frederick Berry, Chicago, Ill., assignor to International Packers Limited, Chicago, Ill., a corporation of Delaware
Filed Dec. 22, 1960, Ser. No. 77,558
2 Claims. (Cl. 17—1)

This invention relates in general to a device for stunning animals prior to slaughtering of the animals and, in particular, to an electrical stunner for that purpose.

In the area of animal slaughtering increased attention has been given to provide a humane way of slaughtering animals. The primary requirement of a humane slaughtering procedure is to provide a means for insuring that the animal perceives none or little pain. The instantaneous loss of sensibility by the animal will achieve this end. Accordingly, procedures were devised to cause instantaneous loss of sensibility wherein the animals would be first stunned by a blow on the head or the like.

One of the difficulties of stunning animals by a blow or the like is that the operator's skill in accurately delivering a blow to a nerve center such as the head was a determining factor in whether the animal would be properly stunned or not. Later developments produced an electrical stunner which would deliver a high voltage to the animal after the animal was struck by the electrodes of the electrical stunner.

Particular difficulty was encountered in the electrical stunning of hairy animals such as, for example, sheep inasmuch as the wool of the sheep would act as a cushion and would prevent good electrical contact of the electrical stunner electrodes with the body of the sheep.

The general object of this invention is to provide an improved electrical stunner for stunning animals prior to slaughtering of the animals.

It is a more specific object of the invention to provide an improved electrical stunning device capable of effectively stunning animals prior to slaughtering thereof which is particularly effective for stunning hairy animals such as sheep.

Accordingly one of the features of the invention is the provision of an electrical stunning device having a weighted end adjacent the electrodes of the electrical stunning device thereby enabling the electrodes to make good contact with the skin of the animal when the electrical stunning device is impelled against the animal's body.

Another feature of the invention is the provision of a rotatable electrode head enabling the operator to adjust the position of the electrodes to suit the operator's swinging style.

Another feature of the invention is the provision of a control switch for the stunning electrodes installed in the handle of the electrical stunner and so designed that accidental pressure by ordinary handling will not activate the control switch for the stunning electrodes.

Briefly, the invention comprises means for delivering electrical energy to an animal of such amplitude as to render the animal instantaneously insensible. A weighted head is provided to insure the proper impelling force to create good electrical contact between the animal and the electrical stunning device. Additional means are provided to accommodate individual operators and safety features as well as other proper design features are incorporated in the electrical stunning device.

Other objects and features of the invention will become more apparent if the following is viewed in light of the drawings of which:

FIGURE 1 is a plan view of an electrical stunning device for stunning animals embodying the features of the invention;

FIGURE 2 is an elevational cross-sectional view taken along the line 2—2 in FIGURE 1;

FIGURE 3 is a fragmentary bottom view of the electrical stunner illustrated in FIGURE 1;

FIGURE 4 is an enlarged side elevational view taken along the line 4—4 in FIGURE 1.

Referring now to the drawings, there is illustrated an electrical stunning device 10 for stunning animals prior to slaughter. The stunning of the animal may be achieved through the use of an electrical shock current applied to the brain of the animal. The electrical shock current is delivered to the electrical stunning device from an electrical power unit (not shown). The electrical stunning device 10 is electrically connected to the power unit (not shown) by a suitable cable 12. The power unit (not shown) does not embody the distinctive features of this invention and an appropriate power unit may be supplied by those skilled in the art.

The electrical stunning device 10 comprises an elongated handle portion 14, illustrated in the drawings as being substantially rectangular in cross-section. The electrical stunning device 10 has integrally formed therein adjacent the elongated handle 14, a hammer head portion 16. The hammer head portion 16 is substantially circular in configuration as can be readily seen in the drawings. A weight member 18 is positioned contiguous with the hammer head portion 16 of the electrical stunning device 14, by means of a threaded lock screw 20. A threaded central bore is provided in the weight member 18 to engage the threaded portion of the lock screw 20. The weight member 18 may be integrally formed with the hammer head 16 if desired. A rotatable electrode holding element 24 is positioned in a recess 22 provided in the hammer head portion 16. The electrode holding element 24 is substantially circular in configuration.

The electrode holding element 24 has integrally formed therein a spacing shoulder 26 and has provided therein a center bore 28 having an enlarged lower center bore area 30. The hammer head portion 16 has a center bore provided therein for the passage of the lock screw 20. The weight member 18, the hammer head portion 16, and the electrode holder element 24 are held against relative movement by the lock screw 20. An enlarged head 32 of the lock screw 20 is positioned within the enlarged portion 30 of the center bore 28 of the electrode holder element 24 under normal locking circumstances. When the lock screw 20 is sufficiently tightened the electrode holder element 24 and the weight member 18 are securely fastened to the hammer head portion 16 of the electrical stunning device 10.

An elastic sealing ring 36 is positioned around the periphery of the electrode holder element 24 in a recess provided in the electrode holder element 24 and seals the interior of the electrical stunning device 10 from penetration by moisture or water spray.

A pair of pointed electrodes 40 and 42 are mounted within the electrode holder device 24 and are electrically insulated from one another, and spaced as seen in the drawings. The shape of the electrodes may be varied slightly to permit penetration of skin. The pair of pointed electrode members 40 and 42 are preferably removable and are screwed into threaded recesses provided therefor in the electrode holder element 24. The electrode holding element 24 is preferably composed of electrical insulating material inasmuch as the pair of electrodes 40 and 42 must be electrically separated from one another. However, alternate schemes for electrically separating the pair of pointed electrodes 40 and 42 are considered to be within the scope of the invention. The pair of pointed electrodes 40 and 42 may preferably be composed of hardened non-corrosive metal.

Positioned within each of the electrodes 40 and 42, as can be more clearly seen in FIGURE 4, are spring loaded contact pins 50 and 52, respectively. The spring loaded contact pins 50 and 52 are slidably positioned within recesses provided within the electrodes 40 and 42, respectively. The contact pins 50 and 52 are springably urged upward by a pair of compression springs 54 and 55 illustrated in FIGURE 4 of the drawings. The compression springs 54 and 55 are positioned within recesses in the electrodes 40 and 42, respectively, below the contact pins 50 and 52 respectively, and urge the contact pins 50 and 52 in an upward direction as seen in FIGURE 4 of the drawings. A pair of commutator rings 60 and 62 are securely attached to the bottom of the recess 22 in the hammer head portion 16 by any convenient means and are electrically separated from one another by any suitable means.

The contact pins 50 and 52 bear against the commutator rings 60 and 62, respectively, and an electrical connection is formed between the pointed electrodes 40 and 42 and the commutator rings 60 and 62, respectively, as illustrated in the drawings.

An elongated central bore 66 is provided in the handle portion 14 of the electrical stunning device 10 and extends from the recess 22 to the right hand end of the handle portion 14 as illustrated in the drawings. A micro-switch 68 is suitably positioned within an enlarged recess 70 in the handle portion 14 of the electrical stunning device 10. A rubber diaphragm 72 is positioned above and completely covers the aperture 70 in the handle portion 14. The rubber diaphragm 72 may be attached to the handle portion 14 by any suitable means. In the drawings the rubber diaphragm member 72 is securely attached to the handle portion 14 by a plurality of screws 74. The rubber diaphragm member 72 has a dished out portion 76 in which is positioned the micro-switch activating lever 78. The micro-switch activating lever 78 may be suitably attached to either the rubber diaphragm member 72 or to the handle portion 14 or may be, as illustrated in the drawings, securely attached to the handle portion 14 through the pressure of the securing screws 74 exerted through the rubber diaphragm element 72. The micro-switch activating plunger 80 is positioned contiguous with the micro-switch activating lever 78 and an operator may activate the micro-switch 68 by pressing on the dished out portion 76 of the rubber diaphragm element 72 thereby depressing the micro-switch activating lever 78 and the activating plunger 80 of the micro-switch 68 and thereby closing the circuit through the micro-switch 68.

The commutator ring 60 is attached to an electrical lead wire 84 and the commutator ring 62 is attached to an electrical lead wire 82. The micro-switch 68 is attached to electrical lead wires 86 and 88, respectively. All four lead wires, 82, 84, 86 and 88, re-enter the cable 12 adjacent the recess 70 in the handle portion 14 of the electrical stunning device 10 and are transmitted through the cable 12 to a suitable power unit (not shown).

Under normal operations when no pressure is applied to the dished out portion 76 of the rubber diaphragm element 72 the electrical circuit to the commutator links 60 and 62 is open and no voltage potential appears across the pointed electrodes 40 and 42. As soon as the micro-switch 68 is activated by an operator pressing on the dished out portion 76 of the rubber diaphragm element 72, the activating plunger 80 of the micro-switch 68 is depressed due to the downward movement of the micro-switch activating lever 78 and an electrical circuit (not shown) is closed to the commutator rings 60 and 62 and a stunning voltage is provided across the pointed electrodes 40 and 42. The voltage should be of sufficient magnitude so as to stun the animal into immediate insensibility when the electrodes 40 and 42 contact the hide of the animal.

The electrode holder element 24 may be rotated within the recess 22 so as to provide the operator of the electrical stunning device 10 with a multiplicity of positions to suit his desired angle of swing. The electrode holder element 24 may be rotated by loosening the lock screw 20 and then manually rotating the electrode holder element 24 within the recess 22 to any desired position. The electrode holder element 24 may then be secured for movement with the weight 18 and the hammer head 16 by tightening down on the lock screw 20. It should be observed that if the electrical stunning device 10 is dropped or brushed against an operator accidentally that the micro-switch 68 will not be easily activated, inasmuch as a positive depressing of the dished out portion 76 of the rubber diaphragm element 72 is required before the micro-switch 68 is closed. This is an important safety feature and helps prevent the accidental actuation of the micro-switch 68.

In operation the electrical stunning device 10 is grasped by an operator such that the operator may depress the dished out portion 76 of the rubber diaphragm element 72 thereby depressing the micro-switch activating plunger 80 and closing the micro-switch 68 when desired. The weighted end portion of the electrical stunning device 10 comprising the weight member 18, the hammer head portion 16, and the electrode holding element 24 provides the same effect that the weighted end of a normal hammer provides, and that is the availability of greater kinetic energy when the electrical stunning device is impelled against the animal. The pointed electrodes 40 and 42 can easily pass through the wool of an animal such as a sheep and make good electrical contact with the hide of the animal, and as soon as the operator energizes or closes the micro-switch 68 an electrical shock path is provided between the electrodes 40 and 42 thereby stunning the animal into insensibility and thereby preventing the animal from undergoing any pain.

Because of the rotatability of the electrode holding element 24, the operator may select the angle which is more suitable to his style of swing. The operator impels the electrical stunning device into the hide of the animal preferably in an area of the animal containing a nerve center such as the head of the animal.

The weight member 18 can be changed to provide the amount of force necessary for good electrical contact between the electrical stunning device and the hides of different animals and to suit different operators. All moving parts of the electrical stunning device are designed to be moisture and water spray proof.

What has been described is considered to be a preferred embodiment of the invention. However, modifications and alterations may be made without departing from the scope of the invention. Therefore, it is intended that the full inventive concept of the invention be defined in the claims which follow.

What is claimed is:

1. In an electrical stunning device, an elongated handle element, a hammer head element attached at one end to said handle element, a pair of electrodes extending from said hammer head element, an electrode holder containing said pair of electrodes rotatably positioned within said hammer head element, a pair of electrically separated commutator links positioned within said hammer head element, a pair of electrically separated spring loaded contact pins positioned within said pair of electrodes springably urged into contact with said pair of commutator links, circuit means extending through said handle element having an open and closed condition for selectively providing an electrical potential across said commutator links and consequently said electrodes, switch means provided in a recess in said handle element for selectively opening and closing said circuit means whereby an electrical potential across said electrodes is selectively delivered to said electrodes.

2. In an electrical stunning device, an elongated handle element, a hammer head element integrally formed at one end of said handle element, a removable weight member attached to said hammer head element, a pair of electrodes extending from said hammer head element, an electrode holding element holding and electrically separating said electrodes rotatable within said hammer head element, a pair of electrically separated commutator links positioned within said hammer head element, a pair of spring loaded contact pins extending from said pair of electrodes and contacting said commutator links for providing an electrical path from said commutator links to said pair of electrodes, circuit means extending through said handle element and attached to said commutator links for selectively providing an electrical potential across said electrodes, switch means provided in said circuit means and positioned in said handle element and recessed from the surface of said handle element for selectively opening and closing said circuit means whereby an electrical potential across the electrodes is selectively delivered to said electrodes.

References Cited in the file of this patent

UNITED STATES PATENTS

| | | |
|---|---|---|
| 2,253,315 | Andrus | Aug. 19, 1941 |
| 2,977,627 | Morse et al. | Apr. 4, 1961 |

FOREIGN PATENTS

| | | |
|---|---|---|
| 573,842 | Germany | Apr. 6, 1933 |
| 585,908 | Germany | Oct. 12, 1933 |